(12) United States Patent
Yuuki

(10) Patent No.: US 6,301,411 B1
(45) Date of Patent: Oct. 9, 2001

(54) LINK STRUCTURE FOR CONNECTING A PLASTIC OPTICAL FIBER TO A LIGHT RECEPTOR

(75) Inventor: Hayato Yuuki, Yokkaichi (JP)

(73) Assignee: Sumitomo Wiring Systems, Ltd., Yokkaichi (JP)

( * ) Notice: Subject to any disclaimer, the term of this patent is extended or adjusted under 35 U.S.C. 154(b) by 0 days.

(21) Appl. No.: 09/175,538

(22) Filed: Oct. 20, 1998

(30) Foreign Application Priority Data

Oct. 21, 1997 (JP) .................................................. 9-288428

(51) Int. Cl.⁷ ...................................................... G02B 6/26
(52) U.S. Cl. .............................. 385/43; 385/39; 385/146; 385/147
(58) Field of Search .............................. 385/43, 147, 146, 385/39

(56) References Cited

U.S. PATENT DOCUMENTS

| | | | |
|---|---|---|---|
| 3,832,028 | * 8/1974 | Kapron | 385/43 |
| 4,521,070 | * 6/1985 | Sottini et al. | 385/43 |
| 4,946,239 | * 8/1990 | Garmon | 385/43 |
| 5,071,217 | * 12/1991 | Birch | 385/33 |

FOREIGN PATENT DOCUMENTS

| | | |
|---|---|---|
| 6169008 | 4/1986 | (JP) . |
| 6323106 | 1/1988 | (JP) . |

* cited by examiner

*Primary Examiner*—Ellen E. Kim
(74) *Attorney, Agent, or Firm*—Greenblum & Bernstein, P.L.C.

(57) ABSTRACT

A light-relay element is interposed between a light-emitting end face of a plastic optical fiber and a light-receiving face of a light receptor such as a photo-diode unit. The light-relay is in the form of a fiber and has a graded index. The light-relay element contains a core portion, the diameter of which decreases gradually from the end adjacent the fiber to the end adjacent the photo-diode unit. This configuration enables minimization of the connection loss between the fiber and the light receptor.

16 Claims, 5 Drawing Sheets

LINK STRUCTURE FOR CONNECTING A PLASTIC OPTICAL FIBER TO A LIGHT RECEPTOR

BACKGROUND OF THE INVENTION

1. Field of the Invention

The present invention relates to a link structure for connecting a plastic optical fiber, mainly used for high-speed communications, to a light receptor. The invention is also concerned with a light-relay element used in the link structure and a method of manufacturing the light-relay element.

2. Description of Background Information

A plastic optical fiber has a core portion, the diameter of which is usually greater than that of the other types of fiber such as a quartz-based optical fiber. This provides a benefit in that the plastic optical fiber can easily be connected to another piece of the same fiber, or to another kind of optical element. For this reason, the components used for the connection require no stringent accuracy. Such a plastic optical fiber provides an economical communications device, which can easily be aligned optically.

In the past when optical communications were mainly carried out at a relatively low speed, the common practice was to put the light-receiving face of a light receiver such as photo-diode unit, directly against the end face of the plastic optical fiber.

Recently, however, as the research into high speed optical communications using a plastic optical fiber has progressed, the connection between the fiber and a light receiver such as photo-diode unit began to create problems.

As is known, the response speed of a photo-diode unit is determined by the time in which the electrons, excited by the light entering into the light-receiving face of the light-receiving portion of the photo-diode unit, reach the electrode inside the photo-diode. In order to obtain a response speed applicable to high-speed optical communications exceeding several hundreds of Mbps, the light-receiving portion of the photo-diode unit must be miniaturized, so that the light-traveling time can be reduced.

Conversely, the miniaturized light-receiving portion can receive only a portion of the light emitted from the end face of plastic optical fiber, so that the connection loss between the fiber and the photo-diode unit is increased.

SUMMARY OF THE INVENTION

The present invention is intended to solve the above-mentioned problem and provides a link structure connecting a plastic optical fiber to a light receptor, enabling minimizing the connection loss therebetween. Other aspects of the press invention include a light-relay element used in the connection structure, as well as a method of preparing the light-relay element.

To this end, there is provided a link structure including a light-relay element formed of a cylindrical tube and a core portion having a refractive index. The light-relay element is interposed between a plastic optical fiber having a light-emitting end face on the one hand, and a light receptor having a light-receiving face which is smaller than the light-emitting end face of the optical fiber on the other. In this structure, the core portion has a diameter decreasing gradually from the light-emitting end face toward the light-receiving face and including a radial direction along which the refractive index is graded.

Further, the core portion may include an axial direction along which the refractive index is also graded.

Preferably, the core portion of the light-relay element has a diameter at one end substantially corresponding to that of the light-emitting end face of the plastic optical fiber, and the core portion has a diameter at the other end substantially corresponding to that of the light-receiving face of the light receptor.

There is also provided a light-relay element includes a cylindrical tube and a core portion having a refractive index. The light-relay element is adapted to be interposed between a plastic optical fiber having a light-emitting end face on the one hand, and a light receptor having a light-receiving face which is smaller than the light-emitting end face on the other. In the light-relay element, the core portion has a diameter decreasing gradually from the light-emitting end face towards the light-receiving face and includes a radial direction along which the refractive index is graded.

The core portion may include an axial direction along which the refractive index is also graded.

Preferably, the core portion of the light-relay element has a diameter at one end substantially corresponding to that of the light-emitting end face of the plastic optical fiber, and the core portion has a diameter at the other end substantially corresponding to that of the light-receiving face of the light receptor.

There is further provided a method of preparing a light-relay element including a cylindrical tube and a core portion having a graded refractive index. The light-relay element is adapted to be interposed between a plastic optical fiber having a light-emitting end face on the one hand, and a light receptor having a light-receiving face which is smaller than the light-emitting end face on the other. The method includes: preparing the cylindrical tube from a polymer having a refractive index, whereby the cylindrical tube includes an inner cylindrical wall having a diameter, and an inner space, the diameter decreasing gradually from the light-emitting end face toward the light-receiving face; putting into the inner space of the cylindrical tube a mixture including a monomer constituting the polymer and a non-polymerizable compound having a refractive index higher than that of the polymer; and polymerizing the monomer while dissolving the inner cylindrical wall of the cylindrical tube.

Preferably, the polymer, monomer and non-polymerizable compounds are a poly (methyl methacrylate), methyl methacrylate and benzyl benzoate, respectively.

BRIEF DESCRIPTION OF THE DRAWINGS

The above and other objects, features and advantages of the present invention will be made apparent from the following description of the preferred embodiments, given as non-limiting examples, with reference to the accompanying drawings, in which.

DETAILED DESCRIPTION OF THE PREFERRED EMBODIMENTS

An example of the link structure for connecting the plastic optical fiber and the photo-diode unit (light receptor) according to an aspect of the present invention is described hereinafter.

Figure 1:
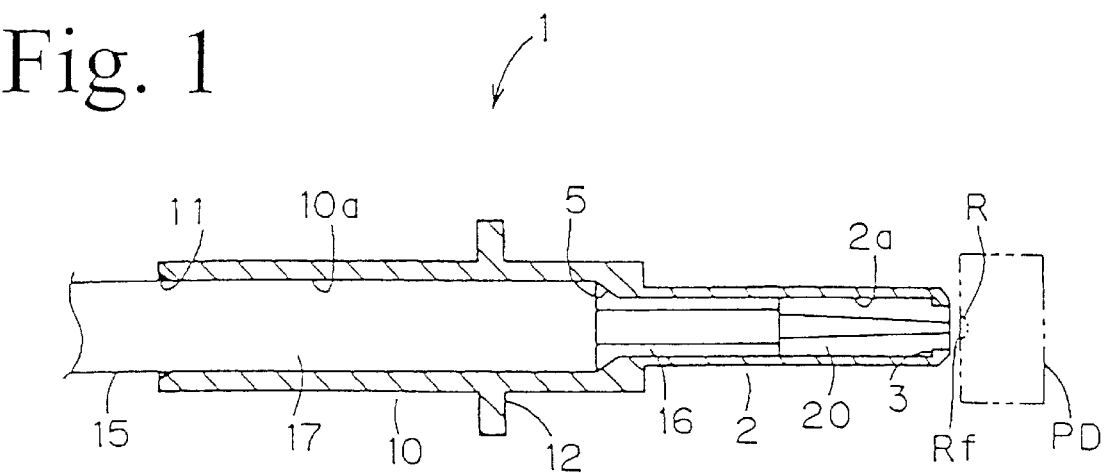
FIG. 1 is a cross-sectional view showing the link structure connecting an optical fiber to a photo-diode unit, according to the invention.
Figure 2:
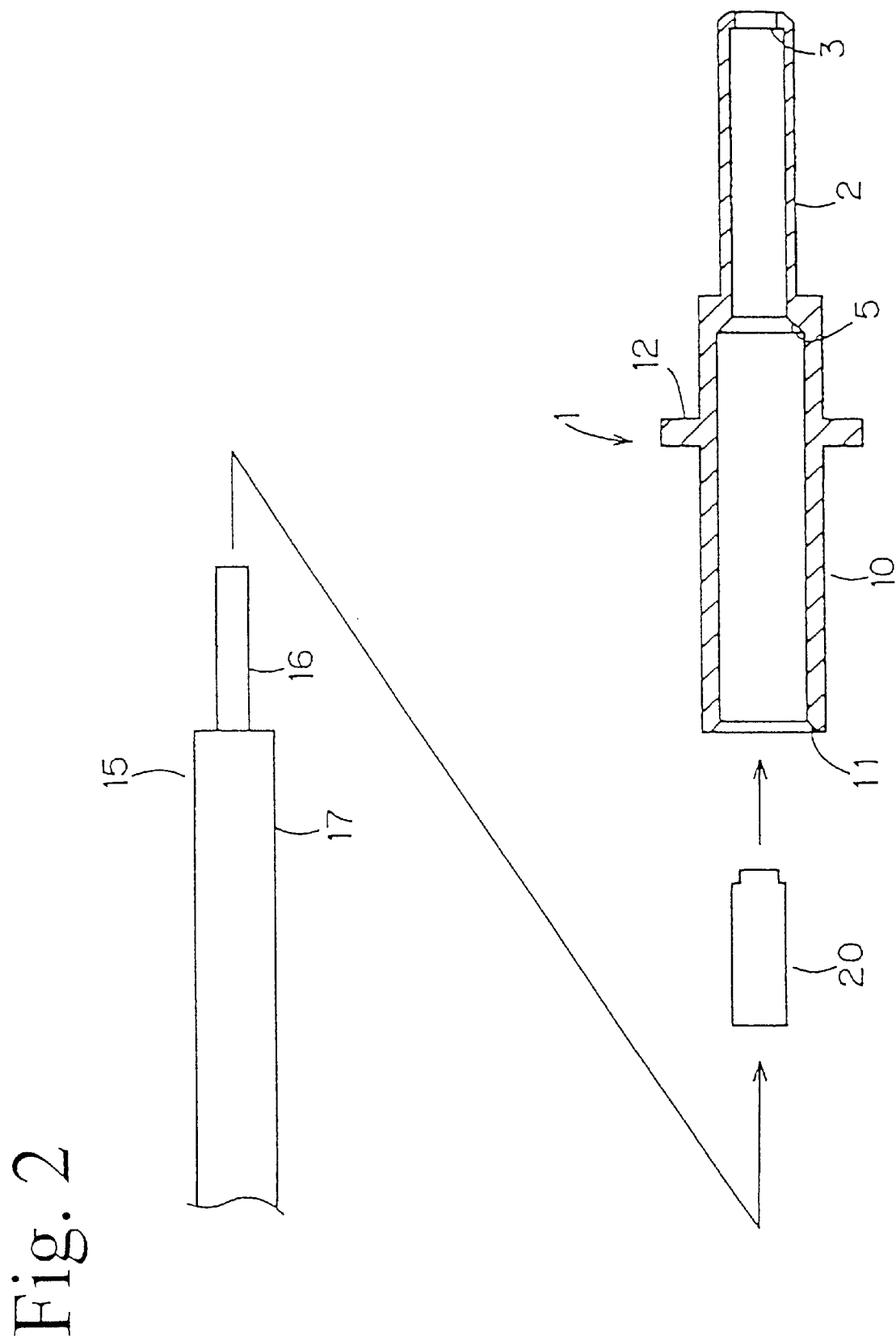
FIG. 2 is an exploded side view of the main part of the link structure of FIG. 1.

In the connecting structure shown in FIG. 1, a ferrule 1 is fixedly contained in a male connector (not shown in the figure) while projecting outwards, and a photo-diode unit PD is fixedly contained in a female connector (not shown in the figure). By fitting the male connector to the female connector, the end of the ferrule 1 is connected face-to-face to the light-receiving portion R of the photo-diode unit PD. FIG. 2 shows an exploded view of the link structure according to FIG. 1.

As shown in these figures, the ferrule 1 includes a small diameter portion 2 and a large diameter portion 10. An optical fiber cable 15 has a cover or sheath portion and an optical fiber 16 exposed at one edge thereof. The small diameter portion 2 of the ferrule 1 holds a light-relay element 20, the large diameter portion 10 thereof holds the edge of the sheath 17 of the optical fiber cable 15. The small diameter portion 2 of ferrule 1 has an inner cylindrical surface 2a and the outer circular end thereof is provided with a flange 3 projecting radially inwardly.

The large diameter portion 10 of ferrule 1 has an inner cylindrical surface 10a, the diameter of which is substantially the same as the outer diameter of the optical fiber cable 15. The diameter of the inner cylindrical surface 10a decreases gradually at one end thereof, thereby forming a tapered portion 5, whereby the large inner cylindrical surface 10a gradually tapers into the small inner cylindrical surface 2a of the small diameter portion 2. On the other hand, the inner diameter at the other end of the large diameter portion 10 gradually tapers outwardly (towards the male connector side), thereby forming a tapered guide 11. Further, the large diameter portion 10 has an outer cylindrical surface which is provided with a circular rib 12 at a position near the one end (female connector side) of the large diameter portion 10.

Figure 3:
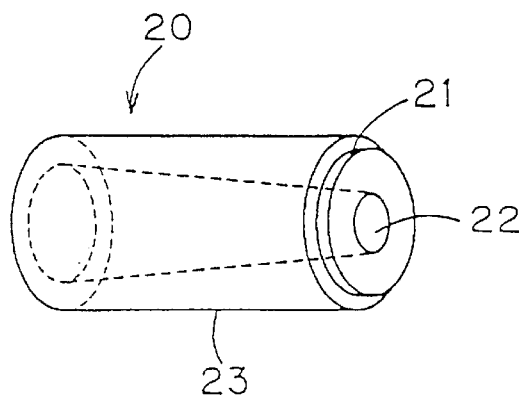
FIG. 3 is a perspective view of the light-relay element according to the invention.
Figure 4:
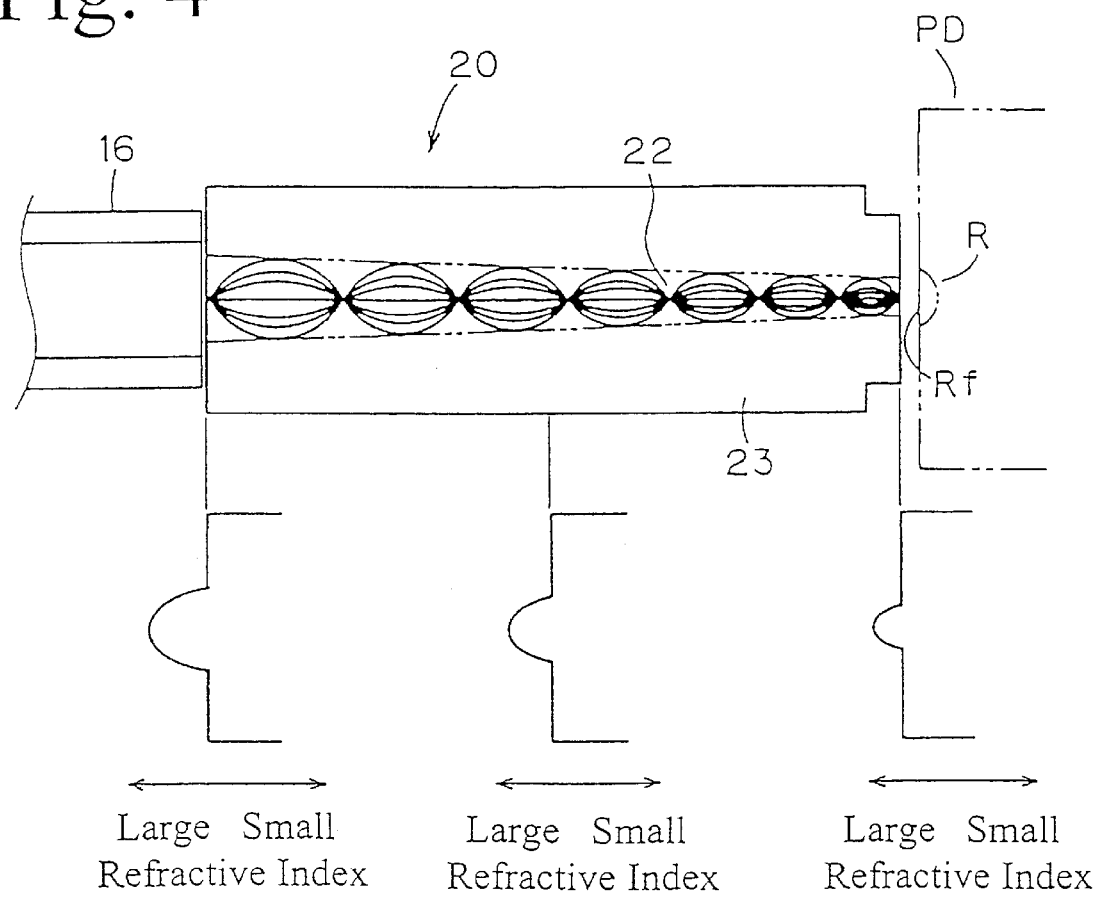
FIG. 4 is a cross-sectional side view showing the refractive index distribution and light propagation pattern within the light-relay element.

As seen in FIGS. 3 and 4, the light-relay element 20 includes a core portion 22 and a cladding portion 23 covering the outer surface thereof. An end of the element 20 is recessed around its outer circular end edge and is polished, to form a recessed portion 21. The length of the light-relay element 20 is determined so as to be about half that of the small diameter portion 2 of the ferrule 1 and the outer diameter thereof is formed to be about the same as the inner diameter of the small diameter portion 2. When the light-relay element 20 is inserted from the male connector side into the ferrule 1 and further into the small diameter portion 2, the flange 3 of the latter fits within the recessed portion 21, so that the light-relay element 20 is fixed at a predetermined position. In this condition, the end face of the light-relay element 20 is exposed at the end face of the small diameter portion 2, and the other end face thereof faces the male connector side at a position about half way along the small diameter portion 2 (as seen in FIG. 1).

The core portion 22 of the light-relay element 20 has an outer diameter decreasing gradually from the male connector end to the female connector end. As shown in FIG. 4, the core portion 22 is formed so that its refractive index distribution in the circular cross-section degreases gradually from the center axis zone towards the circular surface zone, just as in the case of the core portion of a graded index-type optical fiber. Likewise, the refractive index of the core portion 22 in the axial direction decreases gradually from the male connector end of the light-relay element 20 to the female connector end. Moreover, the cladding portion 23 is prepared so as to have a constant refractive index which is lower than the refractive index of the core portion 22 at any position of the core portion 22.

The optical fiber cable 15 is stripped of its sheath 17 in a predetermined length starting from its outer end, so that the optical fiber 16 is exposed in this length. The exposed length of this optical fiber 16 is set to be about the same as the distance between the internal round surface edge of the large diameter portion 10 and the male connector side end of the light-relay element 20.

The light-relay element 20 is then fixedly installed in the small diameter portion 2 of the ferrule 1 and the optical fiber cable 15 is inserted, with its end portion leading, from the male connector side into the ferrule 1. When the edge of the sheath 17 abuts against the narrowing hem of the tapered portion 5, it is hindered from further movement towards the female connector side. Then, the exposed optical fiber 16, extending farther toward the female connector end, has its end face engaging the male connector side end of the light-relay element 20. Thus, the end face of the optical fiber 16 engages the end face of core portion 22 exposed at the male connector end of light-relay element 20.

When the male connector provided with the ferrule 1 is connected to the female connector containing the photo-diode unit to achieve the arrangement as shown in FIG. 1, the end face of core portion 22 in light-relay element 20, exposed at the end face of the ferrule 1, is arranged near, or in contact with, the light-receiving face Rf of the light-receiving portion R in the photo-diode unit PD. With the above-mentioned structural arrangement, the light exiting the end face of the plastic optical fiber 16 passes through the light-relay element 20 and enters the photo-diode unit PD.

First, the light propagates in the optical fiber 16 and leaves the end face thereof. This light enters the core portion 22 of the light-relay element 20 through the exposed end thereof positioned at the male connector side. Then, as shown in FIG. 4, the entering light is gradually converged by the core portion 22, as it propagates towards the female connector end. Subsequently, the light leaves the core portion 22 of the light-relay element 20 through the exposed end thereof positioned at the female connector end. The exiting light then enters the light-receiving face Rf of the photo-diode unit PD.

In such a link structure connecting the plastic optical fiber 16 to the photo-diode unit PD, the light leaving the end face of the fiber 16 is converged by the core portion 22 of the light-relay element 20 and enters the light-receiving face Rf of the photo-diode unit PD. In this way, even when connecting a large core-diameter plastic optical fiber 16 to a photo-diode unit PD having a small diameter light-receiving face Rf, the connection loss can be reduced to a minimum.

When the end-face diameter of core portion 22 of light-relay element 20, located at the end of the plastic optical fiber 16, is made about as large as the diameter of the core portion of the fiber 16, the light leaving the end face of the fiber 16 can be efficiently received in the core portion 22 of the light-relay element 20. The connection loss is thus further reduced.

When the core portion 22 of the light-relay element 20 has an end face diameter at the end adjacent the photo-diode unit PD which is substantially the same as that of the light-receiving face Rf, the light leaving the core portion 22 can be efficiently captured by the light-receiving face Rf. The connection loss can thus be further reduced.

The inclination angle of the core portion 22 is suitably arranged depending on the core diameter of the plastic optical fiber 16, its numerical aperture, the shape of the light-receiving face Rf of the photo-diode unit PD, etc.

In the past, when the photo-diode was molded into a resin package to obtain a photo-diode unit PD, a hemi-spherical lens was laid therein during the molding, so that, in the package obtained, the light leaving the end face of the plastic optical fiber could be converged by this hemi-spherical lens.

However, the optical fibers currently used have a different level of numerical aperture. Thus, when the converging capacity of the hemi-spherical lens and the optical fiber are not matched, a considerable amount of optical loss would be expected.

In contrast, the connecting structure according to the present invention allows one to readily select an appropriate light-relay element 20 which matches the numerical aperture of the plastic optical fiber. The connecting structure of the present invention has thus a wider use.

To cover the photo-diode, a polycarbonate-type multi-functional resin (epoxy resin) is customarily used. This type of resin has a refractive index of 1.56 to 1.59 after hardening, which is relatively high. Accordingly, when the light leaving the light-relay element 20 enters the resin, the light is first refracted so as to form an angle nearer to the perpendicular direction against the light-receiving face Rf, then enters the face Rf. By virtue of this mechanism, the connection loss is further reduced.

The above-mentioned light-relay element 20 can be manufactured, for example, by the following method.

A pure poly (methyl methacrylate) is shaped by extrusion and de-molded using an agent, to obtain an elongated tube 50 having a generally cylindrical outer surface and having an inner diameter of which decreases gradually from one end to the other. The tube is cleaned in ethanol, through ultra-sound, to remove the de-molding agent which can eventually interfere with subsequent chemical reactions. The tube so formed is later used as a cladding portion 23 of the light-relay element 20.

A core portion 22 is formed of a light-wave guiding material 54 which is prepared by mixing about 85 parts by weight of vacuum-distilled methyl methacrylate, about 15 parts by weight of benzyl benzoate, about 0.1 part by weight of n-butyl mercaptan (chain transfer agent) and about 0.1 part by weight of azobisisobutyronitrile (polymerization initiator).

The tube 50 is set upright on a plate and the light-wave guiding material, that is de-gassed by an aspirator beforehand, is poured into the interior space of the cylindrical tube. The upright tube 50 is placed into a heated environment at about 80° C. and the material is polymerized slowly over about 20 hours.

Figure 5:
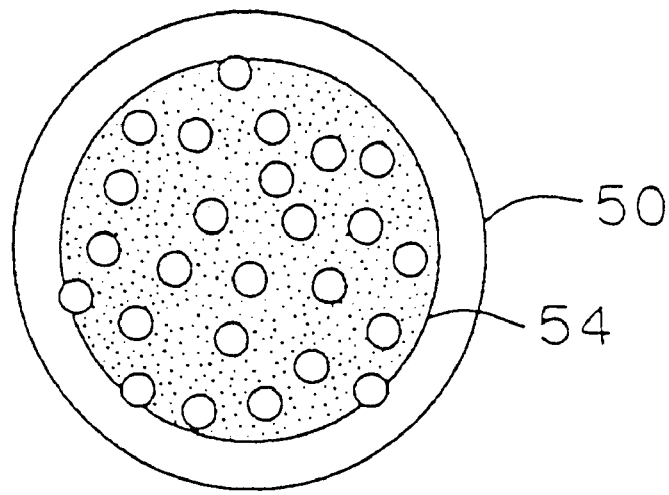
FIG. 5 shows a transverse cross-sectional view of the light-relay element, with preparation of the core portion beginning.
Figure 6:
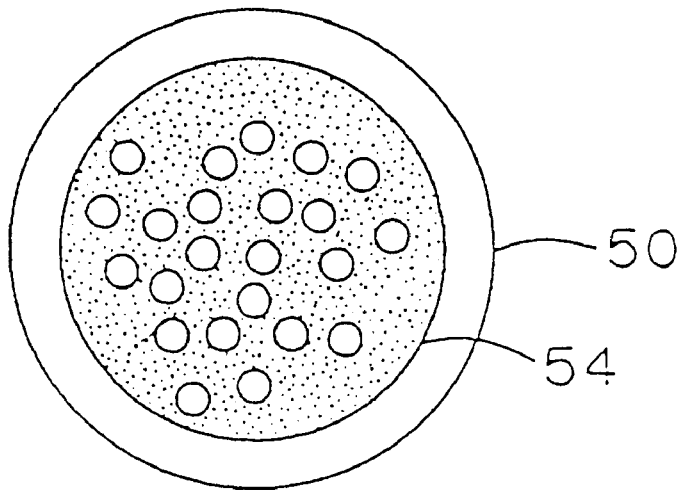
FIG. 6 shows a transverse cross-sectional view of the light-relay element, with the preparation of the core portion at an intermediate stage.
Figure 7:
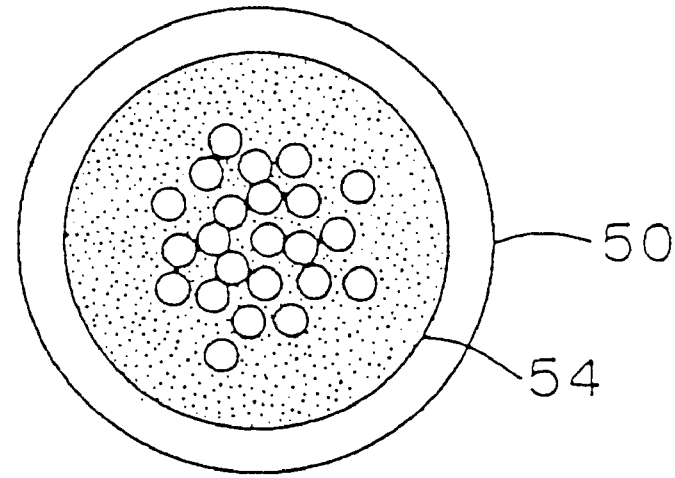
FIG. 7 shows a transverse cross-sectional view of the light-relay element, with the preparation of the core portion further progressed.

The polymerization proceeds as shown in FIG. 5 to FIG. 7. As shown in FIG. 5, when the light-wave guiding material 54 is poured into the inside space of the tube 50, the inner wall of the tube 50 is swollen and dissolved by methyl methacrylate contained in the light-wave guiding material 54. Polymerization proceeds in the swollen part by virtue of the gel effect, so that methyl methacrylate in the light-wave guiding material is consumed. Meanwhile, benzyl benzoate, being present as dopant, cannot polymerize and remains in the central zone as shown in FIGS. 6 and 7. As it stands, the concentration of benzyl benzoate becomes higher from the inner wall of the tube 50 toward the central zone thereof.

In the light-relay element 20 thus prepared, the core portion 22 is made of the light-wave guiding material 54, such that its refractive index distribution will be determined by the concentration ratio of poly (methyl methacrylate) having a refractive index of 1.495 and of benzyl benzoate having a refractive index of 1.56. As benzyl benzoate has a higher refractive index, the central zone of the core portion 22, where benzyl benzoate is at the highest level, has the highest refractive index. When traversing from the central zone of the core portion 22 to the peripheral zone thereof (near the inner wall of the cylindrical tube), the concentration ratio of poly (methyl methacrylate) having a lower refractive index increases gradually, so that the refractive index of the core portion 22 decreases towards the peripheral zone accordingly.

Figure 8:
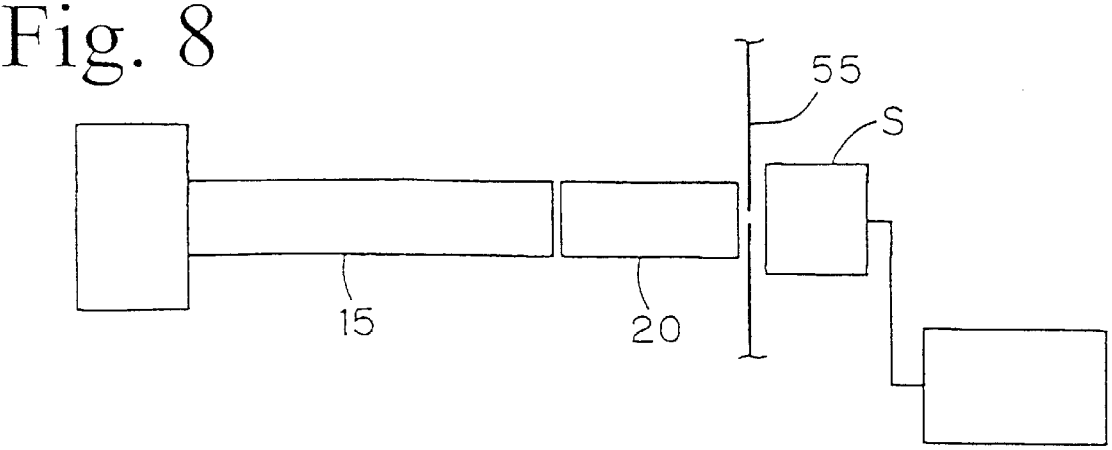
FIG. 8 shows a structural arrangement according to the invention, when measuring the connection loss between the optical fiber and the photo-diode unit.

As mentioned above, the inner diameter of the tube 50 decreases gradually from one end to the other and the core portion 22 is formed by pouring the light-wave guiding material 54 thereinto. In such a structure, the zone in the light-relay element 20 which has a high refractive index distribution becomes narrower from one end of the tube 50 to the other, in accordance with the outer shape of the core portion 22. The light-relay element 20 thus prepared has a numerical aperture of about 0.2. The connection loss caused by the structure connecting the plastic optical fiber to the light receptor is measured as follows, wherein FIG. 8 schematically shows such a connecting structure.

The light-relay element 20, prepared according to the above-mentioned method, has a length of about 8 mm and a diameter of about 1.6 mm. The core portion 22 has an inner diameter at one end (male connector side) of about 0.50 mm, which corresponds to the core diameter of the plastic optical fiber cable 15 described later, and an inner diameter at the other end (female connector side) of about 0.25, which corresponds to the diameter of the light-receiving face Rf of the light-receiving portion R in the photo-diode PD for normal-use high speed optical communications. Both end faces of the core portion 22 are polished by a polishing machine or polishing paper specifically provided for quartz fibers.

As a light source for measurement, an LED module of an apparatus GL link manufactured by Sumitomo Wiring Systems was used. This apparatus was driven continuously through a finely stabilized electrical source, so that a light having a central wavelength of about 700 nm in the LED module was emitted at an output of about 3 dBm. The light in this LED module was led to the photo-diode unit PD through a 2 m plastic optical fiber, obtained by cutting off a portion from a fiber GI-POF (Graded Index-Plastic Optical Fiber).

The connection loss was measured with an Optical Power Meter (Product Number 3292) manufactured by Yokogawa Seisaku Sho, in which the sensitivity center was tuned to a wavelength of 700 nm. The photo-diode unit PD was then replaced by a sensor S of this apparatus and the latter was oriented toward the end face (female connector side) of the light-relay element 20.

In order to measure the light signal intensity to be received by the photo-diode PD for high speed communications, a shutter 55 was interposed between the end face of the light-relay element 20 and the sensor S. The shutter 55 was provided with a pinhole having a diameter of about 0.25 mm, which corresponds to the size of the light-receiving face Rf in the photo-diode unit PD. The pinhole was positioned on the surface of the sensor S, such that, when measured in the dark, it was not disturbed by outside light.

Figure 9:
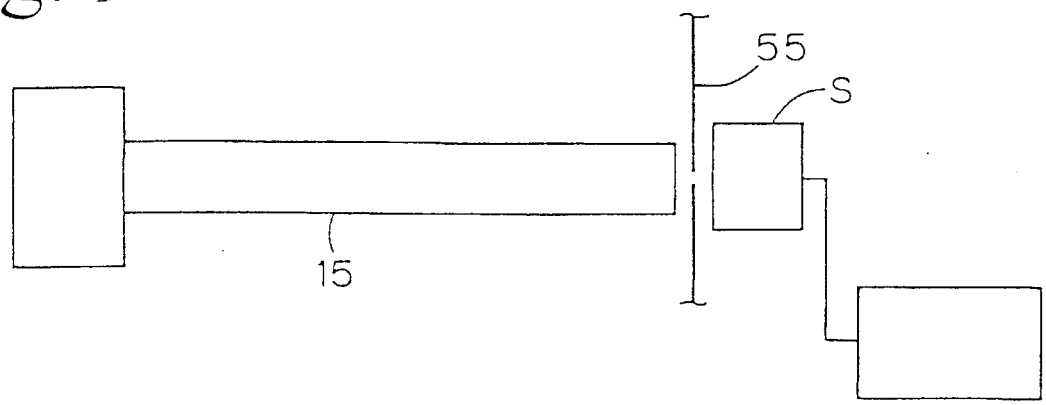
FIG. 9 shows a structural arrangement according to a comparative example, when measuring the connection loss between the optical fiber and the photo-diode unit.

FIG. 9 shows a comparative example, in which the light-relay element 20 is not used. In this case, the light leaving the end face of the optical fiber cable 15 passes through the pinhole of the shutter 55 and directly enters the sensor S. When the light-relay element 20 was used (FIG. 8), the measurement produced a figure of about −15.113 dBm, whereas, when the element 20 was not used (FIG. 9), the figure produced was about −20.881 dBm.

The above result shows that the use of the light-relay element 20 gives rise to a gain of about 5.7 dBm. Accordingly, when connecting a large diameter optical fiber to a photo-diode unit for high speed communications having a small light-receiving face, use of a light-relay element, such as the one described above, provides an efficient connection.

When homogeneous light leaving a 0.5 mm-diameter core portion of an optical fiber is received in a photo-diode unit having a 0.25 mm-diameter light-receiving face, only 25% of the emitted light will be captured if calculated on the basis of the surface ratio. When this is converted to a recovery rate, calculation (−10)×log (0.25) gives a loss of 6.02 dB.

According to the structure of the present invention, connecting a plastic optical fiber to a light receptor, a light-relay element is interposed between an end face of the fiber and a light-receiving face of the light receptor. This light-relay element has a core portion and takes the form of a fiber having a graded refractive index. The core portion has a diameter decreasing gradually from the fiber side to the light-receptor side. By virtue of this configuration, the light emitted from the plastic optical fiber end face is converged by the light-relay element and enters the light receptor's reception face. Consequently, a greater amount of light emitted is captured by the light receptor, so that the optical loss due to the connection between the fiber and the light receptor is minimized.

Further, the core diameter of the element is formed so as to correspond, at one end, to that of the plastic optical fiber and, at the other end, to the face diameter of the light receptor. Consequently, the light emitted from the fiber can be efficiently received by the light-receiving face of the receptor and the connection loss is reduced.

Although the invention has been described with reference to particular means, materials, and embodiments, it is to be understood that the invention is not limited to the particulars disclosed and extends to all equivalents within the scope of the claims.

The present disclosure relates to subject matter contained in priority Japanese Application No. HEI-9-288428, filed on Oct. 21, 1997, which is herein expressly incorporated by reference in its entirety.

What is claimed:

1. An optical communication device comprising a link structure including a light-relay element within a generally conical tube, said light-relay element including said generally conical tube and a core portion having a refractive index, said core portion having a diameter decreasing gradually along an axial direction from a first end to a second end and a radial direction along which said refractive index is graded, a plastic optical fiber having a light-emitting end face, said light-emitting end face engaging said first end of said core portion and having a diameter substantially corresponding to the diameter of said first end of said core portion, and a light receptor comprising a photo diode unit having a light-receiving face, said light-receiving face being one of near and contacting said second end of said core portion and having a diameter substantially corresponding to the diameter of said second end of said core portion, so that connection loss between said core portion and said light receptor is reduced.

2. The optical communication device according to claim 1, wherein said refractive index is graded along said axial direction of said core portion.

3. The optical communication device according to claim 1, wherein said light-relay element further includes a cladding portion covering the outer surface of said core portion, said cladding portion including a cylindrical outer surface.

4. The optical communication device according to claim 3, wherein said light-relay element further comprises a first end and a second end corresponding to said first end and said second end of the core portion, respectively, and said second end of said light-relay element includes a recessed outer circular end edge on the cladding portion that is engageable with a flange on a ferrule for fixedly positioning said light-relay element.

5. The optical communication device according to claim 3, wherein said cladding portion has a constant refractive index that is lower than the refractive index of the core portion.

6. The optical communication device according to claim 1, wherein said photo diode unit includes a resin covering, so that the connection loss between said core portion and said light receptor is reduced.

7. The optical communication device according to claim 6, wherein said resin has a relatively high refractive index.

8. The optical communication device according to claim 6, wherein said resin has a refractive index of between 1.56 to 1.59.

9. An optical communication device comprising a light-relay element including a generally conical tube and a core portion having a refractive index within said conical tube, said core portion having a diameter decreasing gradually from a first end to a second end and a radial direction along which said refractive index is graded, a plastic optical fiber having a light-emitting end face, said light-emitting end face engaging said first end of said core portion and having a diameter substantially corresponding to the diameter of said first end of said core portion, and a light receptor comprising a photo diode unit having a light-receiving face, said light-receiving face being one of near and contacting said second end of said core portion and having a diameter substantially corresponding to the diameter of said second end of said core portion, so that connection loss between said core portion and said light receptor is reduced.

10. An optical communication device according to claim 9, wherein said refractive index is graded along said axial direction of said core portion.

11. The optical communication device according to claim 9, wherein said light-relay element further includes a cladding portion covering the outer surface of said core portion, said cladding portion including a cylindrical outer surface.

12. The optical communication device according to claim 11, wherein said light-relay element further comprises a first end and a second end corresponding to said first end and said second end of the core portion, respectively, and said second end of said light-relay element includes a recessed outer circular end edge on the cladding portion that is engageable with a flange on a ferrule for fixedly positioning said light-relay element.

13. The optical communication device according to claim 11, wherein said cladding portion has a constant refractive index that is lower than the refractive index of said core portion.

14. The optical communication device according to claim 9, wherein said photo diode unit includes a resin covering so that the connection loss between said core portion and said light receptor is reduced.

15. The optical communication device according to claim 14, wherein said resin has a relatively high refractive index.

16. The optical communication device according to claim 14, wherein said resin has a refractive index of between 1.56 to 1.59.

* * * * *